United States Patent
Takeda et al.

(10) Patent No.: US 9,445,403 B2
(45) Date of Patent: Sep. 13, 2016

(54) RADIO COMMUNICATION TERMINAL, BASE STATION APPARATUS, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Sadayuki Abeta, Tokyo (JP); Yuta Sagae, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 217 days.

(21) Appl. No.: 14/350,407

(22) PCT Filed: Oct. 2, 2012

(86) PCT No.: PCT/JP2012/075501
§ 371 (c)(1),
(2) Date: Apr. 8, 2014

(87) PCT Pub. No.: WO2013/054696
PCT Pub. Date: Apr. 18, 2013

(65) Prior Publication Data
US 2015/0036651 A1 Feb. 5, 2015

(30) Foreign Application Priority Data
Oct. 11, 2011 (JP) .................. 2011-224342

(51) Int. Cl.
*H04L 5/00* (2006.01)
*H04W 72/04* (2009.01)
*H04W 4/00* (2009.01)

(52) U.S. Cl.
CPC ......... *H04W 72/0406* (2013.01); *H04W 4/005* (2013.01); *H04W 72/042* (2013.01); *H04W 72/0453* (2013.01)

(58) Field of Classification Search
None
See application file for complete search history.

(56) References Cited

U.S. PATENT DOCUMENTS

| 6,091,757 A * | 7/2000 | Cudak | H04L 1/0002 370/508 |
| 2010/0118730 A1* | 5/2010 | Tanaka | H04L 1/0028 370/252 |

(Continued)

OTHER PUBLICATIONS

International Search Report for corresponding International Application No. PCT/JP2012/075501, mailed Dec. 18, 2012 (1 page).

(Continued)

*Primary Examiner* — Fan Ng
(74) *Attorney, Agent, or Firm* — Osha Liang LLP

(57) ABSTRACT

The present invention is designed to provide a radio communication terminal, a base station apparatus, a radio communication system and a radio communication method which can reduce the cost to be required for an MTC terminal when the LTE system is employed in the network domain of a machine communication system. A radio communication terminal according to the present invention is a radio communication terminal that performs machine communication via a base station apparatus of a radio communication system that is operated such that a frequency becomes the first band at a maximum, depending on the performance which a communication device supports, and has a receiving section that has receiving performance to be able to support the first band, and that decodes the entire band of the first band at least with respect to a time domain where a downlink control channel is allocated, and a transmission section that has transmission performance to be able to support a second band having a narrower bandwidth than the first band, and that allocates an uplink control channel and an uplink data channel to the second band.

14 Claims, 9 Drawing Sheets

(56) References Cited

U.S. PATENT DOCUMENTS

2010/0232374 A1* 9/2010 Ofuji ............... H04J 13/00
370/329
2013/0142038 A1* 6/2013 Pan ............... H04L 47/283
370/230

OTHER PUBLICATIONS

Alcatel-Lucent et al.; "Considerations on potential solutions for low-cost MTC UEs;" 3GPP TSG RAN WG1 Meeting #66bis, R1-113334; Zhuhai, China; Oct. 10-14, 2011 (4 pages).

Samsung; Low-Cost MTC UEs based on LTE; 3GPP TSG RAN WG1 #66bis, R1-113101; Zhuhai, China; Oct. 10-14, 2011 (3 pages).

3GPP TS 22.368 V10.5.0; "3rd Generation Partnership Project; Technical Specification Group Services and System Aspects; Services requirements for Machine-Type Communications (MTC); Stage 1 (Release 10);" Jun. 2011 (17 pages).

Office Action issued in corresponding Japanese Application No. 2011-224342, mailed Aug. 4, 2015 (7 pages).

* cited by examiner

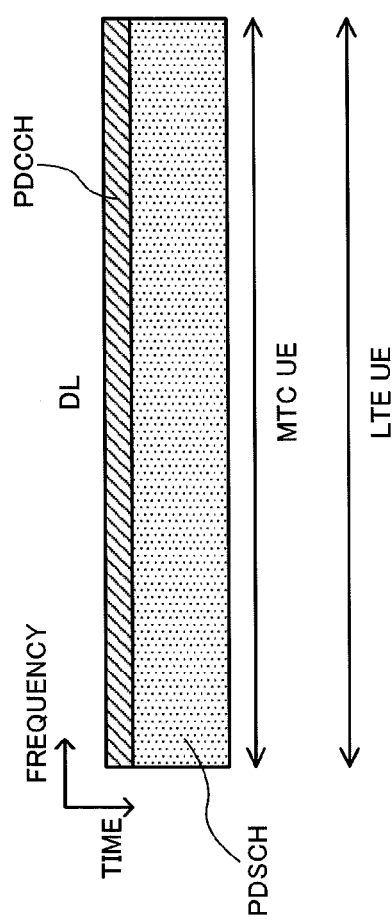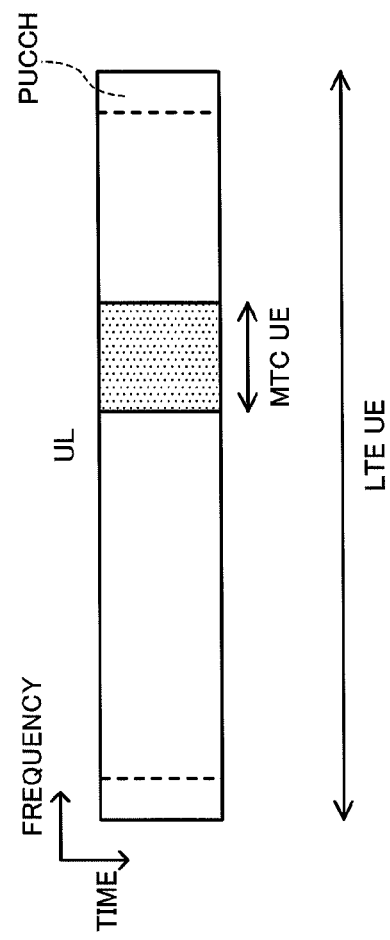
FIG. 2A
FIG. 2B

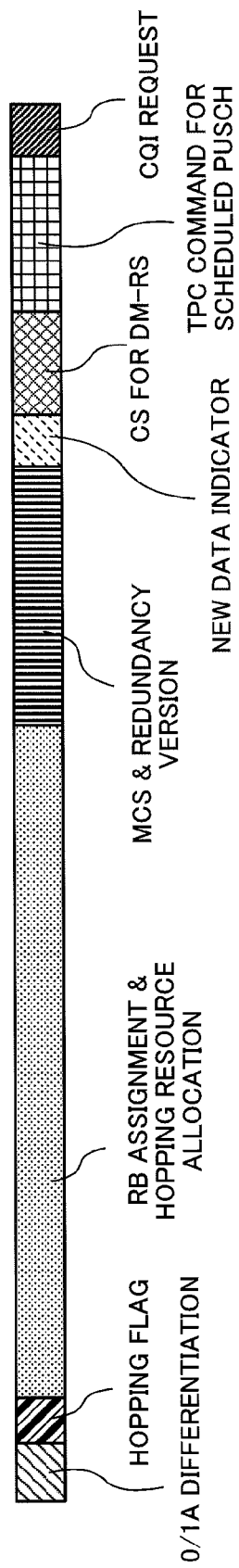
FIG. 3A
FIG. 3B

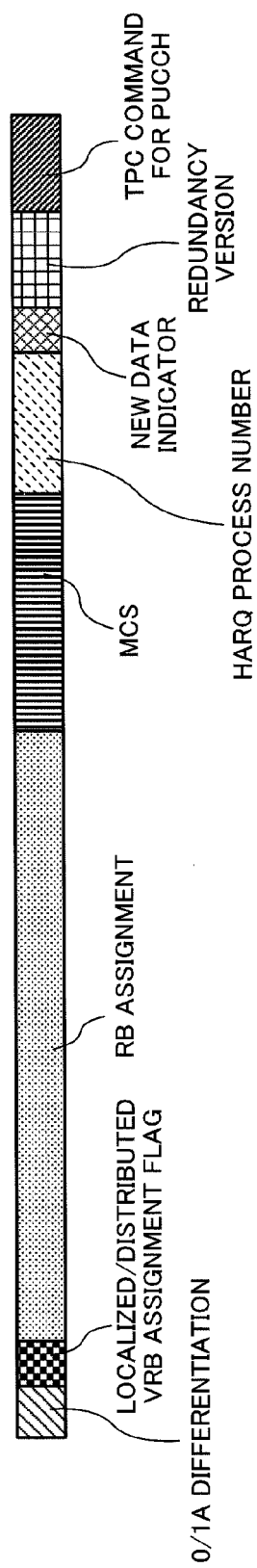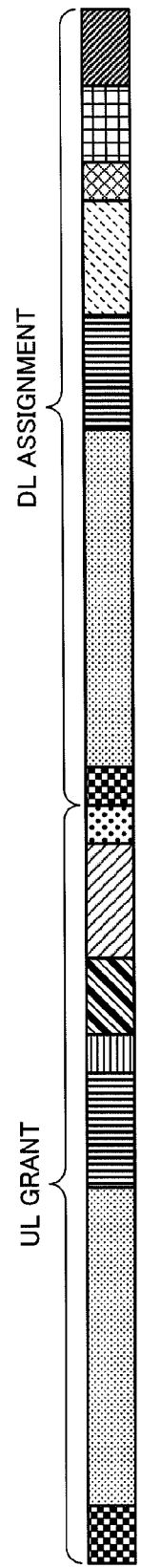
FIG. 4A
FIG. 4B

RADIO COMMUNICATION TERMINAL, BASE STATION APPARATUS, RADIO COMMUNICATION SYSTEM AND RADIO COMMUNICATION METHOD

TECHNICAL FIELD

The present invention relates to a radio communication terminal, a base station apparatus, a radio communication system and a radio communication method that are applicable to machine communication systems.

BACKGROUND ART

In recent years, technologies related to machine communication (Machine-to-Machine Communication), in which services are provided through autonomous communication between devices, have been under development. The European telecommunications standards institute (ETSI) defines three domains—namely, the application domain, the network domain, and the device domain—as a machine communication system reference model. Of these, in the device domain, application to lifeline control, which covers electricity, gas and water, to highway traffic systems (Intelligent Transport System (ITS)), and so on, is already under study for practical use.

In the network domain, a cellular system that is based on the provisions of the 3GPP (3rd Generation Partnership Project) is a promising candidate to be employed. Consequently, with the 3GPP, activity to standardize machine communication, which is defined as "MTC (Machine-Type Communication)," has started (non-patent literature 1).

CITATION LIST

Non-Patent Literature

Non-Patent Literature 1: 3GPP, TS22.368 (V10.5.0), "MTC communication aspects," June 2011

SUMMARY OF THE INVENTION

Technical Problem

Now, in LTE (Long Term Evolution), which is agreed upon in the 3GPP, it is possible to achieve a transmission rate of about maximum 300 Mbps on the downlink and about 75 Mbps on the uplink, by using a variable band that ranges from 1.4 MHz to 20 MHz. However, MTC is under study on the premise of a comparatively slow communication environment, and problems might arise if the LTE system (including Rel. 8/9/10 and later versions) is applied as is to MTC. The requirements for an MTC system are, for example, 118.4 kbps for the downlink and 59.2 kbps for the uplink, which are not as high as for the LTE system. Consequently, when a radio communication terminal that is customized for an MTC system (hereinafter referred to as "MTC terminal") tries to satisfy the requirements for the LTE system, the radio communication terminal would be over-engineered, and its cost of manufacturing would increase.

The present invention has been made in view of the above, and it is therefore an object of the present invention to provide a radio communication terminal, a base station apparatus, a radio communication system and a radio communication method which can reduce the cost required for an MTC terminal when the network domain of a machine communication system employs the LTE system.

Solution to Problem

A radio communication terminal according to the present invention is a radio communication terminal that performs machine communication via a base station apparatus of a radio communication system that is operated such that a frequency becomes a first band at a maximum, depending on performance which a communication device supports, and has a receiving section that has receiving performance to be able to support the first band, and that decodes an entire band of the first band at least with respect to a time domain where a downlink control channel is allocated; and a transmission section that has transmission performance to be able to support a second band having a narrower bandwidth than the first band, and that allocates an uplink control channel and an uplink data channel to the second band.

Technical Advantage of the Invention

According to the present invention, when the network domain of the machine communication system employs the LTE system, it is possible to reduce the cost required for an MTC terminal.

BRIEF DESCRIPTION OF THE DRAWINGS

FIG. 2 provides diagrams for explaining the downlink receiving performance and uplink transmission performance of an MTC terminal;

FIG. 3A is a conceptual diagram of uplink control information that is reported to an LTE terminal via the downlink;

FIG. 3B is a conceptual diagram of a newly-defined DCI format 0;

FIG. 4 is a configuration example of a DCI format;

DESCRIPTION OF EMBODIMENTS

Now, an embodiment of the present invention will be described below in detail with reference to the accompanying drawings.

Figure 1:
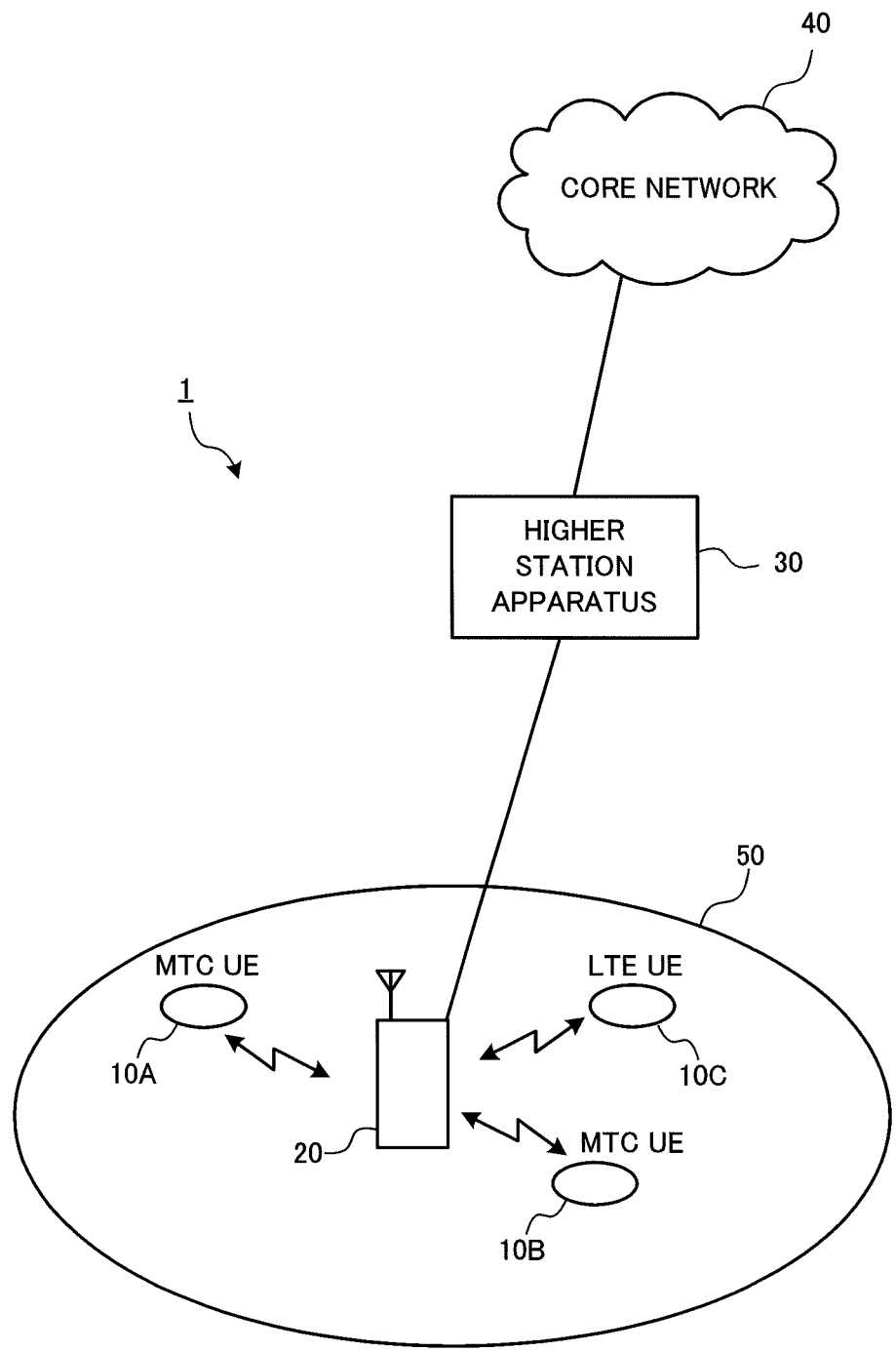
FIG. 1 is a diagram for explaining a system configuration of a radio communication system according to the present embodiment.

First, the radio communication system according to the present embodiment will be described with reference to FIG. 1. The radio communication system shown in FIG. 1 is an example of employing the LTE system in the network domain of a machine communication system. A radio communication system to support LTE-Advanced (including Rel. 10 and later versions) employs carrier aggregation, which uses a plurality of fundamental frequency blocks (component carriers), where one unit is maximum 20 MHz, to extend the system band up to maximum 200 MHz. In the following description, assume that the LTE system is set in a system band of maximum 20 MHz on both the downlink and the uplink.

As shown in FIG. 1, a radio communication system 1 is configured to include a radio base station apparatus 20, and a plurality of radio communication terminals 10A, 10B and 10C that connect with the radio base station apparatus 20 by radio for radio communication. For example, the radio communication terminals 10A and 10B are MTC terminals to serve as communication devices in a machine communication system, and the other radio communication terminal 10C is a mobile terminal apparatus (hereinafter referred to as "LTE terminal") to support LTE (Rel. 10) or LTE-A Advanced (including Rel. 10 and later versions). The radio base station apparatus 20 is connected with a higher station apparatus 30, and this higher station apparatus 30 is connected with a core network 40. A plurality of radio communication terminals 10A, 10B and 10C are able to communicate with the radio base station apparatus 20 in a cell 50. Note that the higher station apparatus 30 includes, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is adopted on the downlink, and SC-FDMA (Single-Carrier Frequency Division Multiple Access) is adopted on the uplink, but the radio access schemes are by no means limited to these. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing the system band into bands each formed with one or continuous resource blocks, and allowing a plurality of terminals to use mutually different bands. The LTE terminal has communication capacity to be able to support maximum 20 MHz for both the downlink and the uplink.

Here, channel configurations in the LTE system will be described. The downlink channel configurations include a PDSCH (Physical Downlink Shared Channel), which is used by a plurality of LTE terminals on a shared basis as a downlink data channel, and a PDCCH (Physical Downlink Control Channel), which is a downlink control channel. Transmission data and higher control information are transmitted by the PDSCH. By the PDCCH, downlink control information (DL assignment), including PDSCH scheduling information and so on, and uplink control information (UL grant), including PUSCH scheduling information and so on, are transmitted. Besides these, the downlink channel configurations include a PCFICH (Physical Control Format Indicator Channel), a PHICH (Physical Hybrid-ARQ Indicator. Channel) and so on. The PCFICH reports CFI values, which show how many symbols from the top symbol of a subframe are allocated the PDCCH. The PDSCH is allocated to the time region from the last symbol where the PDCCH is allocated to the last symbol of that subframe.

The uplink channel configurations include a PUSCH (Physical Uplink Shared Channel), which is used by a plurality of LTE terminals on a shared basis as an uplink data channel, and a PUCCH (Physical Uplink Control Channel), which is an uplink control channel. By means of this PUSCH, uplink transmission data and ACK/NACK are transmitted. Also, by means of the PUCCH, downlink radio quality information (CQI: Channel Quality Indicator), ACK/NACK and so on are transmitted. Besides these, the uplink channel configurations define a PRACH (Physical Random Access Channel). The PRACH is used to transmit random access preambles and so on.

Upon designing configurations for connecting an MTC terminal with an LTE system having such channel configurations by radio, the present inventors have focused on the fact that, from the perspective of reducing the cost of the MTC terminal, it is effective to demand of the MTC terminal receiving performance to be able to support a communication band equal to that of an LTE terminal on the downlink, and yet demand transmission performance to be able to support only a band that is narrow compared to that of an LTE terminal on the uplink.

The first aspect of the present invention provides MTC terminals having receiving performance to be able to support a system band of maximum 20 MHz like LTE terminals, and having transmission performance limited to a narrower band than the uplink system band for LTE terminals.

FIG. 2 is a diagram to explain the downlink receiving performance and the uplink transmission performance of the MTC terminals. FIG. 2A shows the downlink receiving performance that is demanded of the MTC terminals, and FIG. 2B shows the uplink transmission performance that is demanded of the MTC terminals. As shown in FIG. 2A, like the LTE terminal (radio communication terminal 10C), the MTC terminals (radio communication terminals 10A and 10B) also have receiving performance to be able to support a system band of maximum 20 MHz. That is, similar to the LTE terminal, the radio communication terminals 10A and 10B, which are MTC terminals, receive and decode the PDCCH over the entire band of 20 MHz, and receive the PDSCH based on the downlink control information included in the decoded PDCCH.

On the other hand, as shown in FIG. 2B, for the MTC terminals (radio communication terminals 10A and 10B), the band which can be supported on the uplink is limited to a narrow band compared to the band (20 MHz) in which the LTE terminal (radio communication terminal 10C) is capable of uplink communication. Hereinafter, the uplink band that is allocated to the MTC terminals will be referred to as "PUSCH_MTC."

Although the LTE terminal transmits uplink control signals in PUCCHs that are placed at both ends of the system band (20 MHz), the uplink band of the MTC terminals is limited, and so PUCCHs are not placed at both ends of the PUSCH_MTC. Although hybrid ARQ acknowledgements, CQIs that assist downlink channel-dependent scheduling, and resource requests for uplink data transmission are transmitted by the PUCCH, the MTC terminals transmit these signals in the PUSCH_MTC.

To alleviate the impact on the LTE system, the size of the PUSCH_MTC is preferably one of 1.4 MHz, 3 MHz, 5 MHz, 10 MHz and 15 MHz, which are supported by the LTE system. Alternatively, a bandwidth of 1.08 MHz, which matches the band of the PRACH, may be applied as well. However, the bandwidth to be applied is by no means limited to these.

The radio communication terminals 10A and 10B, whose uplink bandwidth is limited, transmit all of data signals, higher control information, and uplink control channel signals, by the PUSCH. When a PUSCH and a PUCCH that are separate are placed over a wide frequency band (for example, 20 MHz) as is the case with normal LTE terminals, high transmission performance to meet the LTE requirements is demanded of the radio communication terminals 10A and 10B. So, with the radio communication terminals 10A and 10B, rather than placing PUCCHs at both ends of the system band like the LTE terminal, a PUSCH_MTC is arranged in a predetermined narrow band based on resource allocation information, and uplink transmission is performed using this PUSCH_MTC.

In this way, in the uplink communication channel, by limiting the PUSCH_MTC to a predetermined bandwidth that is narrower than for the LTE terminal, it is possible to alleviate the frequency characteristics of the filters that are used in the transmitting/receiving sections of the radio communication terminals 10A and 10B, the requirement for the transmission power of the power amplifier, and so on. Also, since the frequency domain of the Fourier transform upon uplink transmission is narrowed, it is possible to reduce the load of the processing section that performs the FFT. By this means, it is possible to reduce the cost of the MTC terminals. Also, the downlink requirement for the MTC terminals is not different from that of the LTE terminal, so that it is possible to minimize the impact to be given upon the radio base station apparatus 20 that supports LTE.

The radio base station apparatus 20 allocates radio resources for the PUSCH_MTC, to the MTC terminals that are connected by radio. The method of reporting to the MTC terminals the radio resources for the PUSCH_MTC allocated to the MTC terminals, will be described below.

The second aspect of the present invention provides MTC terminals, to which, like LTE terminals, radio resources for the to PUSCH_MTC are reported using uplink control information (UL grant).

The PUSCH_MTC is limited to a significantly narrow band compared to the uplink band of the LTE terminal (maximum 20 MHz). Consequently, there is a possibility that the number of uplink control information (UL grant) bits can be reduced.

FIG. 3A is a conceptual diagram of uplink control information that is reported from the radio base station apparatus 20, which supports LTE, to the LTE terminal, via the downlink. Uplink control information is generated in the radio base station apparatus 20 in a format such as DCI (Downlink Control Information) format 0, and transmitted by the PDCCH.

As shown in FIG. 3A, the DCI (format 0) includes "0/1A differentiation," which serves as an identifier to show the type of the DCI format, "RB assignment & hopping resource allocation," which shows the resource allocation on the uplink, and "MCS," which reports the modulation scheme and coding rate for the uplink, and so on. It is possible to use uplink control information having the same format as shown in FIG. 3A for the MTC terminals (radio communication terminals 10A and 10B) as well. In this case, the arrangement of uplink resources (transmission frequency positions) that are allocated to the MTC terminals is reported by the RB assignment, and the modulation scheme and coding rate are reported using the MCS. In LTE, the arrangement of uplink resources is reported by the RB index, which shows the position of the top RB (Resource Block) in the PUSCH, and the bandwidth of RBs (which to may also be represented as the number of RBs that continue).

The uplink resources (PUSCH_MTC) allocated to the MTC terminals (radio communication terminals 10A and 10B) have a significantly narrow band compared to that of the LTE terminal. Consequently, a new DCI for reporting the band and modulation scheme of the PUSCH_MTC adequately may be defined.

To be more specific, the bandwidth to use for the PUSCH_MTC is fixed in advance, the top resource block index of the PUSCH_MTC is reported using "RB assignment & hopping resource allocation," and information about the bandwidth to use for the PUSCH_MTC is not signaled. As described above, although, in the LTE system, the bandwidth which an LTE terminal uses is reported using the top resource block index and the number of resource blocks that continue, it is also possible to reduce the information bits to represent bandwidth by "RB assignment & hopping resource allocation," by fixing the bandwidth of the PUSCH_MTC in advance.

Also, the modulation scheme of transmission signals that are transmitted in the PUSCH_MTC is limited to one modulation scheme (for example, QPSK). By limiting the modulation scheme to one modulation scheme (for example, QPSK), the coding rate alone is reported. In the LTE system, the modulation scheme is selected from QPSK, 16QAM, and 64QAM, and the number of information bits to be set in "MCS" to represent the modulation scheme becomes big. However, if there is no need to select the modulation scheme, the information bits for selecting the modulation scheme can be reduced. FIG. 3B is a conceptual diagram of DCI format 0 that is newly defined for uplink control information (UL grant) for the MTC terminals. As shown in this drawing, information bits to represent the bandwidth of the PUSCH_MTC are subtracted from "RB assignment & hopping resource allocation," and information bits to represent the modulation scheme are subtracted from "MCS."

Note that, although a method of reporting resources allocated on the uplink using uplink control information (UL grant) that is reported from the radio base station apparatus 20 by the PDCCH has been shown, it is equally possible to use signaling methods other than uplink control information (UL grant).

According to the third aspect of the present invention, resources allocated to the PUSCH_MTC are reported from the radio base station apparatus 20 to the MTC terminals using higher layer signaling (for example, RRC signaling). When the bandwidth of the PUSCH_MTC is fixed in advance, the top resource block index of the PUSCH_MTC is reported to the MTC terminals by a higher control signal. By this means, it is possible to subtract the information bits to represent the top resource block index of the PUSCH_MTC and its bandwidth, from the "RB assignment & hopping resource allocation" field in uplink control information.

As noted earlier, it is possible to reduce the number of bits of uplink control information (DCI format 0) by limiting the bandwidth of uplink resources allocated to the MTC terminals on the uplink. Since the number of bits of uplink control information (DCI format 0) is reduced, it then becomes possible to newly define downlink channel control information (DCI) that triggers DL/UL at the same time with one DCI.

According to the fourth aspect of the present invention, as a function to trigger DL/UL at the same time with one DCI, uplink control information (UL grant) and downlink control information (DL assignment) are transmitted at a time to the MTC terminals.

FIG. 4 shows configuration examples of DCI formats that realize the function to trigger DL/UL at the same time with one DCI. To the LTE terminal, downlink control information such as shown in FIG. 4A is reported by the PDCCH. On the other hand, to the MTC terminals, as shown in FIG. 4B, a format to transmit uplink control information and downlink control information at a time is applied. In the event of the format shown in FIG. 4B, it is not necessary to distinguish between uplink control information and downlink control information, so that the information bits of "0/1A differentiation," which represents the type of the DCI format, are subtracted. Also, when uplink control information and downlink control information are transmitted at the same time, CRC (Cyclic Redundancy Check) information bits (for example, 16 bits) may be allocated over the entire uplink control information and downlink control information. Consequently, it is possible to reduce the number of CRC information bits compared to the case where CRC information bits are allocated to uplink control information and to downlink control information separately.

In this way, by limiting the uplink bandwidth for the MTC terminals in the radio communication system 1 according to the present embodiment, it is possible to reduce the cost of the radio communication terminals 10A and 10B that are used in MTC.

Also, according to the fifth aspect of the present invention, among the radio resources to allocate to the downlink for the MTC terminals, the PDCCH is allocated to the entire band of the system band (20 MHz), while the PDSCH is allocated to a narrow band than the PDCCH. For example, when the allocation of the PDSCH is limited on the downlink, the MTC terminals decode the limited band alone. When the downlink data rate for the MTC terminals is low, it is possible to improve the system throughput by reducing the allocation band for the PDSCH of the MTC terminals.

Figure 5:
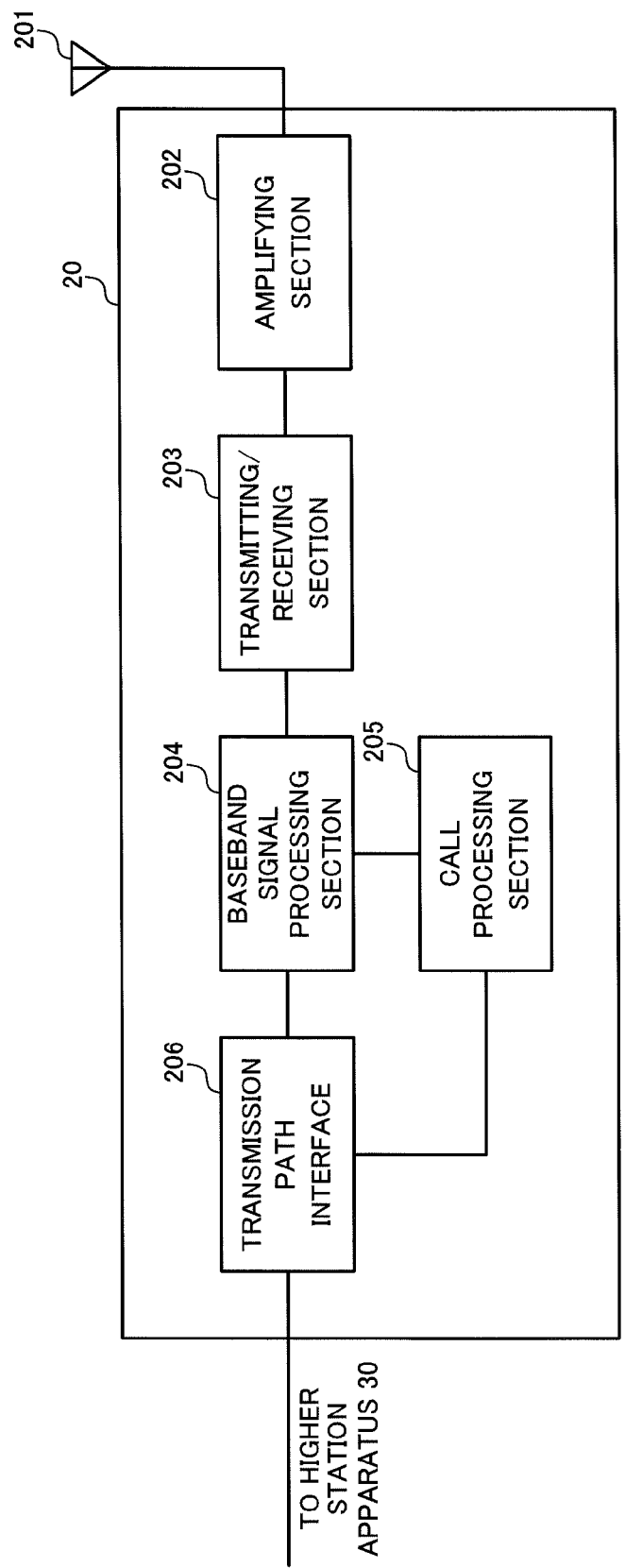
FIG. 5 is a block diagram to show an overall configuration of a radio base station apparatus according to the present embodiment.

Now, an embodiment of the present invention will be described below in detail. FIG. 5 is a block diagram showing an overall configuration of a radio base station apparatus according to the present embodiment. The radio base station apparatus 20 has a transmitting/receiving antenna 201, an amplifying section 202, a transmitting/receiving section 203, a baseband signal processing section 204, a call processing section 205, and a transmission path interface 206. Transmission data to be transmitted on the downlink from the radio base station apparatus 20 to the MTC terminals (radio communication terminals 10A and 10B) is input from the higher station apparatus 30, into the baseband signal processing section 204, via the transmission path interface 206.

In the baseband signal processing section 204, a signal of the downlink data channel is subjected to, for example, a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for a signal of the physical downlink control channel, which is a downlink control channel, transmission processes such as channel coding and an inverse fast Fourier transform are performed.

Also, through a broadcast channel, the baseband signal processing section 204 reports control information that allows the MTC terminals (radio communication terminals 10A and 10B) to perform radio communication with the radio base station apparatus 20, to the MTC terminals (radio communication terminals 10A and 10B) that are connected to the same cell. The information to allow communication in the cell includes, for example, the uplink or downlink system bandwidth, identification information of a root sequence (root sequence index) for generating random access preamble signals in the PRACH (Physical Random Access Channel), and so on.

The baseband signal that is output from the baseband signal processing section 204 is converted into a radio frequency band in the transmitting/receiving section 203. The amplifying section 202 amplifies the radio frequency signal subjected to frequency conversion, and outputs the result to the transmitting/receiving antenna 201.

On the other hand, as for signals to be transmitted from the MTC terminals (radio communication terminals 10A and 10B) to the radio base station apparatus 20 on the uplink, a radio frequency signal that is received in the transmitting/receiving antenna 201 is amplified in the amplifying section 202, converted into a baseband signal by frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the radio base station apparatus 20 and manages the radio resources.

Figure 6:
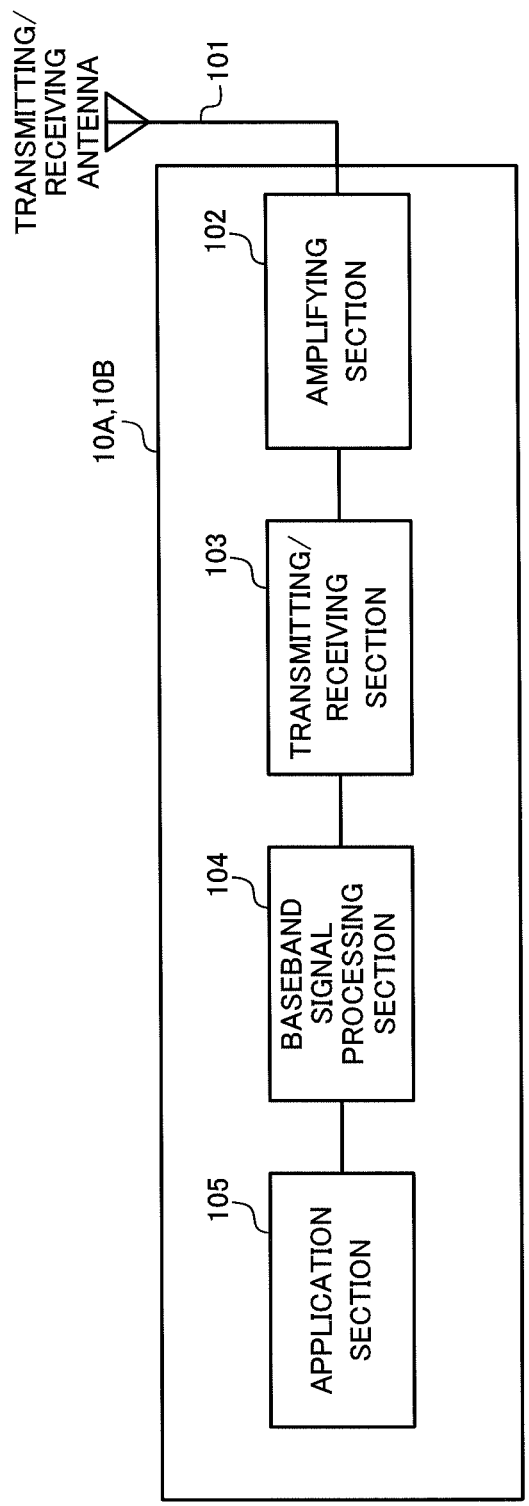
FIG. 6 is a block diagram to show an overall configuration of a radio communication terminal according to the present embodiment.

FIG. 6 is a block diagram to explain an overall configuration of the radio communication terminals 10A and 10B according to the present embodiment. The radio communication terminals 10A and 10B each have a transmitting/receiving antenna 101, an amplifying section 102, a transmitting/receiving section 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the to transmitting/receiving antenna 101.

Figure 7:
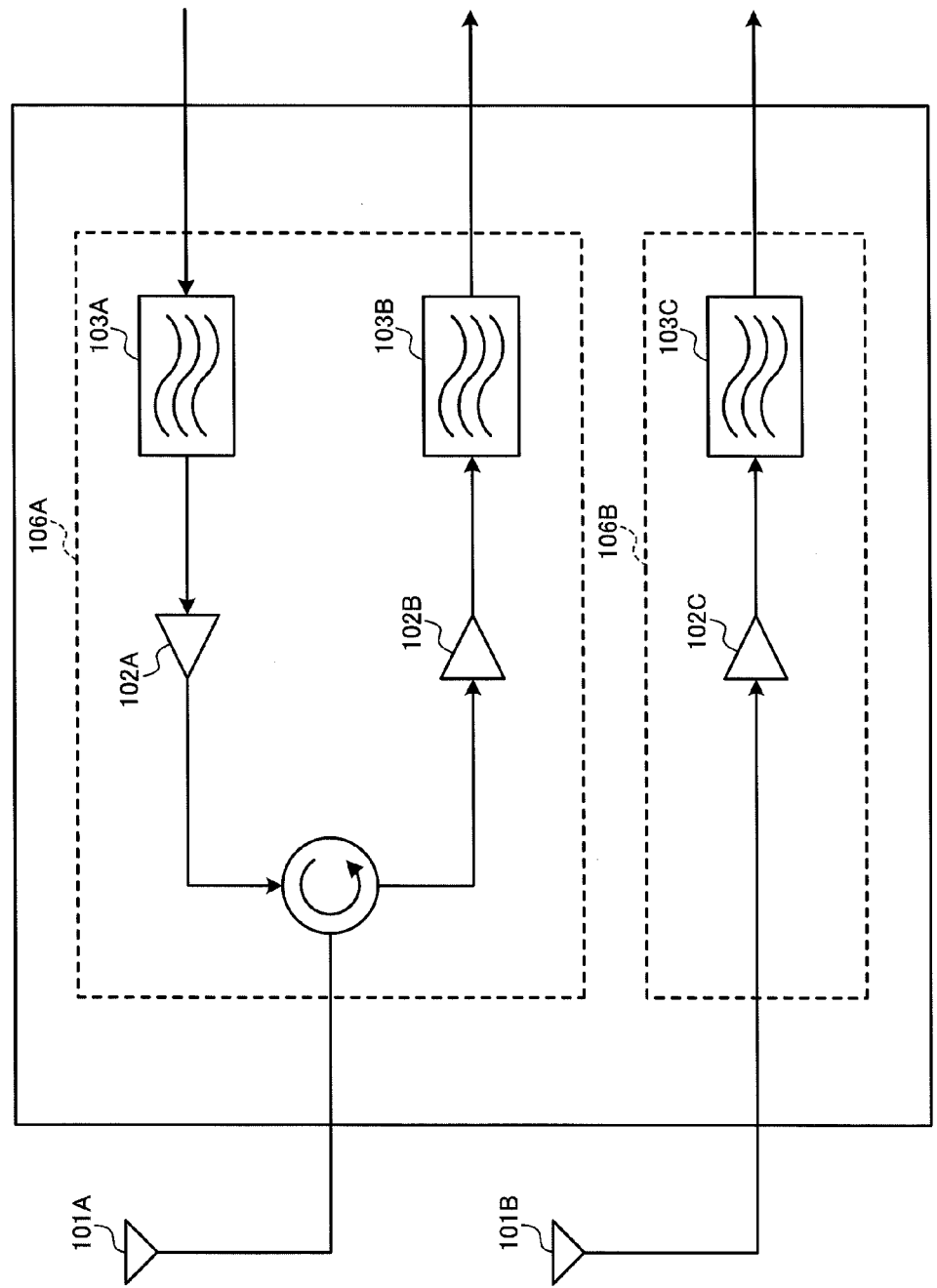
FIG. 7 is a circuit diagram to explain a configuration example of transmitting/receiving ports in an MTC terminal.

FIG. 7 is a circuit diagram to explain a configuration example of transmitting/receiving ports in the MTC terminals (radio communication terminals 10A and 10B) according to the present embodiment. As shown in FIG. 7, the radio communication terminals 10A and 10B have a transmitting/receiving port 106A and a receiving port 106B, which are equivalent to the amplifying section 102 and the transmitting/receiving section 103. The transmitting/receiving port 106A is connected with the transmitting/receiving antenna 101A, and the receiving port 106B is connected with the receiving antenna 101B. By this means, a transmission sequence of 1-branch diversity and a receiving sequence of 2-branch diversity are realized.

The transmitting/receiving port 106A has, as a transmission sequence, a transmission filter 103A that cuts signals outside the uplink transmission band, and a high-power amplifier 102A that amplifies signals to be transmitted on the uplink. Also, as a receiving sequence, the transmitting/receiving port 106A has an LNA 102B that amplifies signals received on the downlink, and a receiving filter 103B that cuts signals outside the receiving band. The receiving port 106B has an LNA 102C that amplifies signals that are received on the downlink, and a receiving filter 103C that cuts signals outside the receiving band.

For the radio communication terminals 10A and 10B, the band that can be supported on the uplink is limited to a narrow band compared to the maximum band (20 MHz) in which the LTE terminal (radio communication terminal 10C) can communicate on the uplink. Consequently, compared to the LTE terminal, the performance to be demanded of the transmitting port is alleviated. For example, the band which the transmission filter 103A of the radio communication terminals 10A and 10B support may be narrower than the band which the transmission filter of the LTE terminal supports. Also, the output of the high-power amplifier 102A of the radio communication terminals 10A and 10B may be smaller than the output of the high-power amplifier of the LTE terminal. In this way, with the radio communication system 1 according to the present embodiment, it is possible to alleviate the transmission performance of the radio communication terminals 10A and 10B, and, as a result, reduce the cost and power consumption of the radio communication terminals 10A and 10B.

Figure 8:
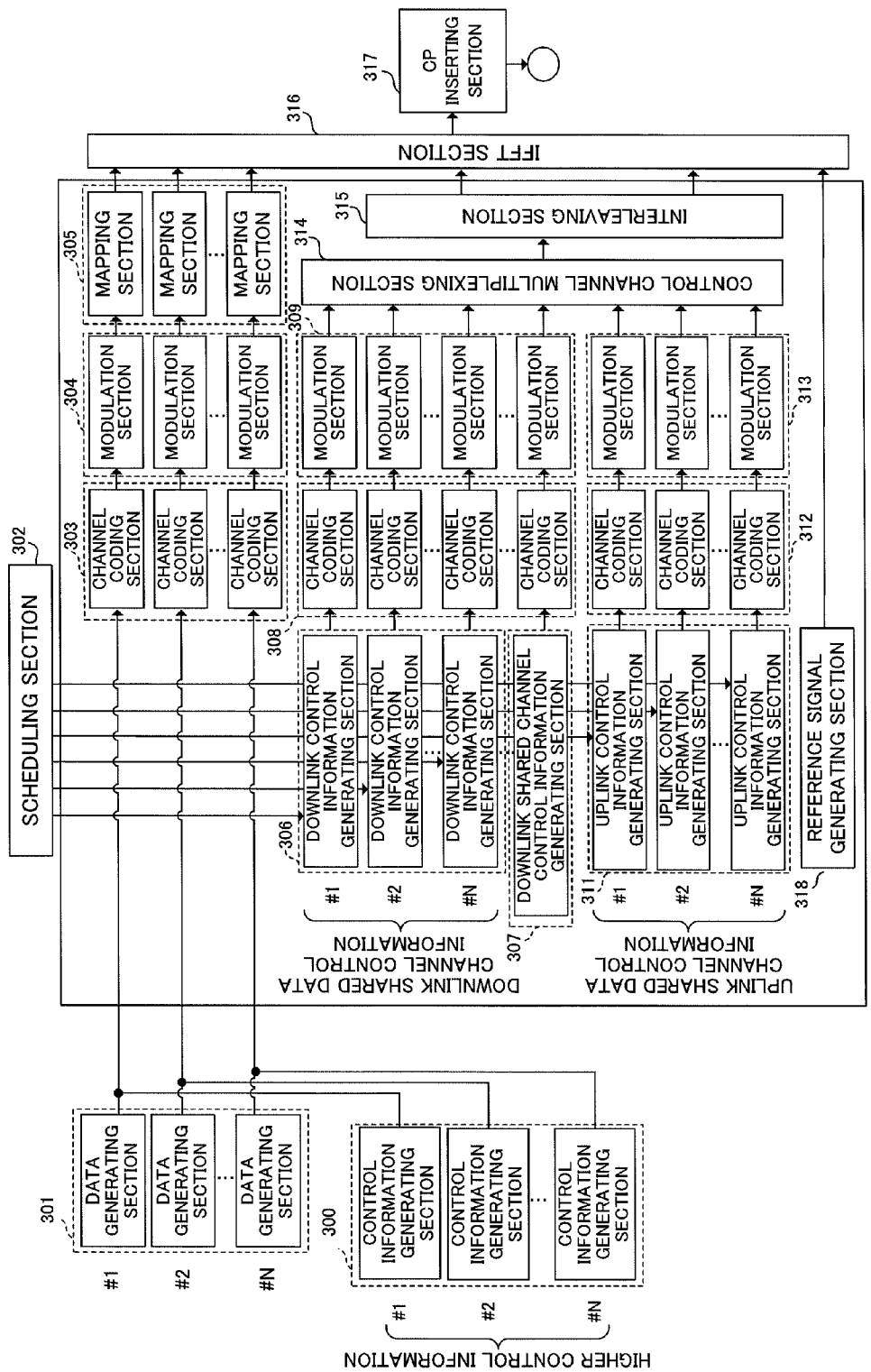
FIG. 8 is a block diagram to show a configuration of a baseband processing section of a radio base station apparatus according to the present embodiment.

FIG. 8 is a functional block diagram of a baseband signal processing section 204 provided in the radio base station apparatus 20 according to the present embodiment, and part of the higher layers. The baseband signal processing section 204 primarily shows the function blocks of a transmission processing section. Transmission data for the MTC terminals (radio communication terminals 10A and 10B) and the LTE terminal (radio communication terminal 10C) that are connected with the radio base station apparatus 20 by radio is transferred from the higher station apparatus 30 to the radio base station apparatus 20.

Control information generating sections 300 generate higher to control signals for performing higher layer signaling (for example, RRC signaling), on a per user basis. When, in accordance with the third aspect of the present invention, resources allocated to the PUSCH_MTC are reported to the MTC terminals using higher layer signaling, the higher control signal may include information related to allocation of the PUSCH_MTC. To be more specific, for example, the higher control signal may include information to represent the top resource block index of the PUSCH_MTC (in this case, the bandwidth of the PUSCH_MTC may be fixed). In this way, when information related to allocation of the PUSCH_MTC is included in the higher control signal, it is possible to reduce the number of downlink control information bits.

Data generating sections 301 output transmission data transferred from the higher station apparatus 30 as user data, separately, on a per user basis.

A scheduling section 302 controls resource allocation for each radio communication terminal. Also, the scheduling section 302 receives as input transmission data and retransmission commands from the higher station apparatus 30, and also receives as input channel estimation values, resource block CQIs, and the type of terminals (as to whether a terminal is an MTC terminal or an LTE terminal), from the receiving section having measured an uplink received signal. Also, the scheduling section 302 schedules MTC terminals and LTE terminals (including LTE-A terminals) separately, from the received signal on the uplink.

The scheduling section 302 schedules downlink allocation information, uplink allocation information and uplink/downlink shared channel signals, with reference to the retransmission commands, channel estimation values and CQIs that are received as input from the higher station apparatus 30.

A propagation path in mobile communication varies differently per frequency, due to frequency selective fading. So, upon transmission of user data to the LTE terminal, the scheduling section 302 applies adaptive frequency scheduling, and allocates resource blocks of good communication quality on a per subframe basis. In adaptive frequency scheduling, for each resource block, an LTE terminal of good propagation path quality is selected and assigned. Consequently, the scheduling section 302 allocates resource blocks that anticipate improved throughput, using the CQI of each resource block, fed back from the LTE terminal. Also, the number of CCE aggregations is controlled according to the propagation path conditions with the LTE terminal. Also, the MCS (coding rate and modulation scheme) that fulfills a predetermined block error rate with the allocated resource blocks is determined. Parameters that satisfy the MCS (coding rate and modulation scheme) determined by the scheduling section 302 are set in channel coding sections 303, 308 and 312, and in modulation sections 304, 309 and 313, corresponding to the LTE terminals.

When, in accordance with the above-described second aspect, radio resources for the PUSCH_MTC are reported to the MTC terminals using uplink control information (UL grant), the scheduling section 302 schedules uplink allocation information such that information related to the PUSCH_MTC is included, for the MTC terminals. Also, the scheduling section 302 fixes the modulation scheme in the MCS (coding rate and modulation scheme) to QPSK, for MTC terminals. Parameters that satisfy the MCS (coding rate and modulation scheme) determined by the scheduling section 302 are set in channel coding sections 303, 308 and 312, and in modulation sections 304, 309 and 313, corresponding to the MTC terminals.

The baseband signal processing section 204 has channel coding sections 303, modulation sections 304, and mapping sections 305 to match the maximum number of users to be multiplexed, N. The channel coding sections 303 perform channel coding of the shared data channel (PDSCH), formed with user data (including part of higher control signals) that is output from the data generating sections 301, on a per user basis. The modulation sections 304 modulate user data having been subjected to channel coding, on a per user basis. The mapping sections 305 map the modulated user data to radio resources.

Also, the baseband signal processing section 204 has downlink control information generating sections 306 that generate downlink control information, which is terminal-specific control information, a downlink shared channel control information generating section 307 that generates downlink shared control channel control information, which is control information that is common between terminals, channel coding sections 312 that perform, on a per user basis, channel coding of the control information generated in the downlink control information generating sections 306 and the downlink shared channel control information generating section 307, and modulation sections 313 that modulate downlink control information having been subjected to channel coding.

The downlink control information generating sections 306 generate downlink control information (for example, DCI format 1) that is formed with resource allocation information, MCS information, HARQ information, PUCCH transmission power control commands and so on, which are determined on a per terminal basis.

Also, the baseband signal processing section 204 has uplink control information generating sections 311 that generate uplink control information, which controls the uplink shared data channel (PUSCH), on a per terminal basis, channel coding sections 312 that perform channel coding of uplink control information that is generated, on a per terminal basis, and modulation sections 313 that modulate uplink control information having been subjected to channel coding, on a per terminal basis.

The uplink control information generating sections 311 generate uplink control information (for example, DCI format 0/4) from allocation information, which shows the number of resource blocks and the positions of resource blocks, the modulation scheme, the coding rate, the redundancy version, an identifier (new data indicator) to identify between new data and reconstructed data, a PUSCH transmission power control command, the cyclic shift of the demodulation reference signal (CS for DMRS), the CQI request, PMI/RI and so on, which are determined on a per terminal basis.

That is, the uplink control information generating sections 311 corresponding to the MTC terminals generate uplink control information that includes information related to the top resource block index and the number of resource blocks that continue in the band which the MTC terminals use on the uplink, in accordance with the determination of the scheduling section 302. Also, when the bandwidth to use is fixed in advance, the MTC terminals are able to identify the band to use from the top resource block index, so that it is also possible to generate uplink control information in which information about the number of resource blocks that continue is omitted. Also, when the band which the MTC terminals use on the uplink is reported by a higher control signal, it may also be possible to generate uplink control information omitting information about both the top resource block index and the number of resource blocks that continue.

Also, the uplink control information generating sections 311 corresponding to the MTC terminals generate uplink control information that includes the MCS (coding rate and modulation scheme) determined by the scheduling section 302. When the uplink modulation scheme is fixed to QPSK, it is also possible to generate uplink control information in which information about the modulation scheme is omitted.

The reference signal generating section 318 multiplexes and transmits CRSs (Cell-specific Reference Signals), which are used for various purposes such as channel estimation, symbol synchronization, CQI measurement, mobility measurement and so on, in resource blocks (RBs), in FDM/TDM. Also, the reference signal generating section 318 transmits downlink demodulation reference signals (UE-specific RSs).

The downlink control information and uplink control information that are modulated in the above modulation sections 309 and 313 on a per terminal basis are multiplexed in a control channel multiplexing section 314, and are furthermore interleaved in an interleaving section 315. Control signals that are output from the interleaving section 315 and user data that is output from the mapping sections 305 are input in an IFFT section 316 as downlink channel signals. Also, the downlink demodulation reference signals generated in the reference signal generating section 318 are input in an IFFT section 316. The IFFT section 316 performs an inverse fast Fourier transform of the downlink channel signals and the downlink demodulation reference signals, and converts the frequency domain signals into time domain signals. A cyclic prefix (CP) inserting section 317 inserts cyclic prefixes, which function as guard intervals for cancelling the error from multi-path propagation delay, in the time sequence signal of the downlink channel signals. Transmission data, to which cyclic prefixes have been added, is transmitted to the transmitting/receiving section 203.

When, in accordance with the above-described fourth aspect, uplink control information (UL grant) and downlink control information (DL assignment) are transmitted to the MTC terminals at the same time, instead of the downlink control information generating sections 306 and the uplink control information generating sections 311, a control information generating section that generates downlink control information and uplink control information in a format that allows simultaneous transmission of these, may be provided. Obviously, it is also possible to integrate, and transmit at the same time, the downlink control information and the uplink control information that are generated separately in the downlink control information generating sections 306 and uplink control information generating sections 311.

Figure 9:
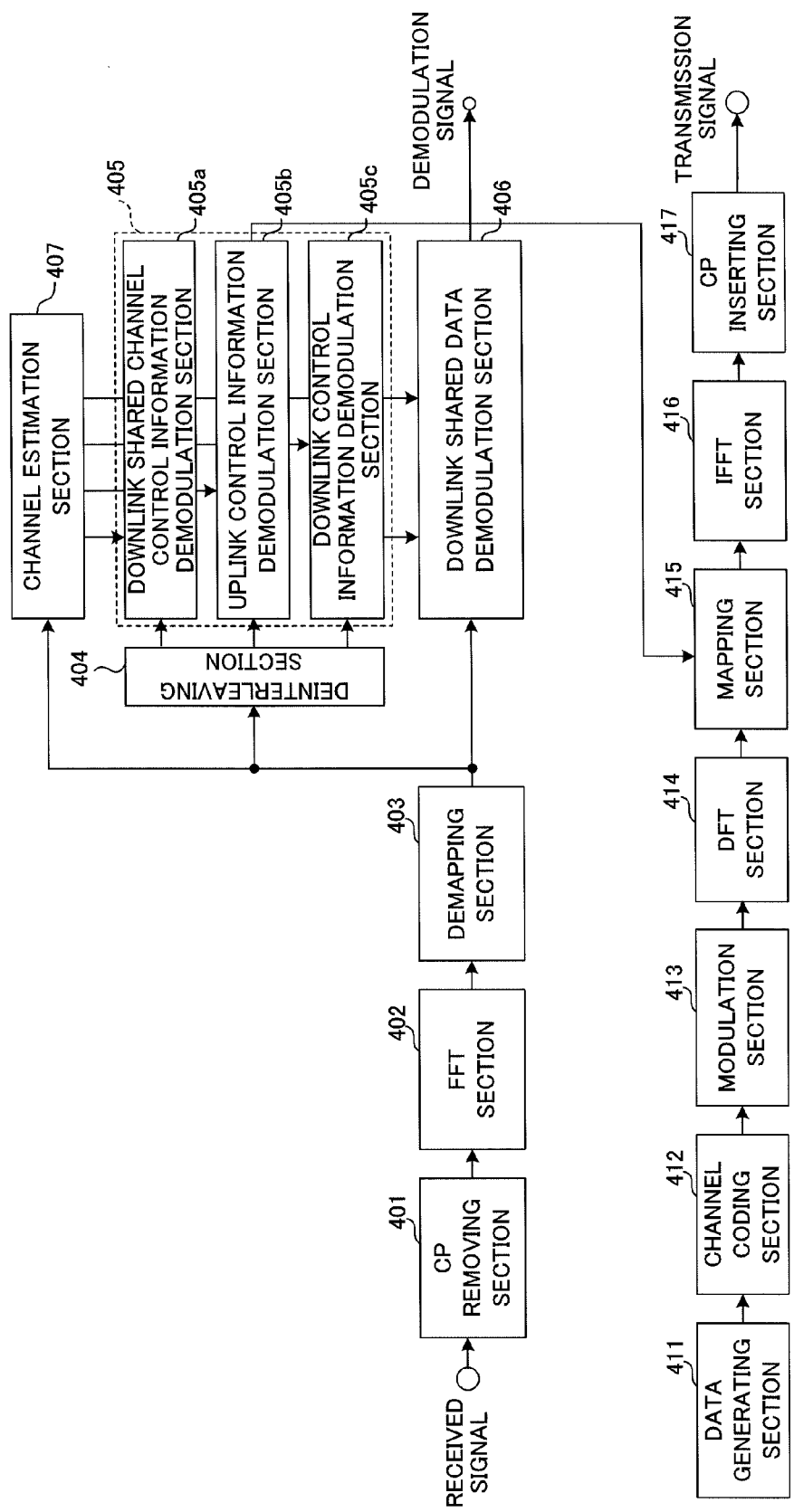
FIG. 9 is a block diagram to show a configuration of a baseband processing section in a radio communication terminal according to the present embodiment.

FIG. 9 is a functional block diagram of the baseband signal processing section 104 provided in the MTC terminals (radio communication terminals 10A and 10B). First, the downlink configuration will be described.

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal, and inputs this signal in a demapping section 403. The demapping to section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information that is output from the demapping section 403 is deinterleaved in a deinterleaving section 404.

Also, the baseband signal processing section 104 has a control information demodulation section 405 that demodulates downlink/uplink control information, a downlink shared data demodulation section 406 that demodulates downlink shared data, and a channel estimation section 407. The control information demodulation section 405 has a downlink shared channel control information demodulation section 405a that demodulates downlink shared control channel control information from the downlink control channel, an uplink control information demodulation section 405b that demodulates uplink control information from the downlink control channel, and a downlink control information demodulation section 405c that demodulates downlink control information from the downlink control channel.

The downlink shared channel control information demodulation section 405a extracts downlink shared control channel control information, which is downlink control information that is common between users, by the blind decoding process, demodulation process, channel decoding process and so on of the common search space of the downlink control channel (PDCCH).

The uplink control information demodulation section 405b extracts user-specific uplink control information by performing a blind decoding process, a demodulation process, a channel decoding process and so on, of the user-specific search spaces of the downlink control channel (PDCCH). The extracted uplink control information is sent to the channel coding section 412, the mapping section 415, and so on, which will be described later. When, in accordance with the above-described second aspect of the present invention, radio resources for the PUSCH_MTC are reported from the radio base station apparatus 20 using uplink control information (UL grant), the extracted uplink control information includes uplink allocation information related to the PUSCH_MTC. Consequently, this uplink allocation information is sent to the mapping section 415 and used to arrange (map) the resources for the PUSCH_MTC. Also, the coding rate reported by the MCS included in the uplink control information is used in the channel coding in the channel coding section 412. As described earlier, when information bits related to the modulation scheme is omitted from the MCS by fixing the modulation scheme, a modulation scheme that is fixed in advance is applied to the uplink.

The downlink control information demodulation section 405c extracts downlink control information, which is a user-specific downlink control signal, by performing a blind decoding process, a demodulation process, a channel decoding process and so on, of the user-specific search space of the downlink control channel (PDCCH). The demodulated downlink control information is input in the downlink shared data demodulation section 406 and used to demodulate the downlink shared data channel (PDSCH).

Note that, when, in accordance with the fourth aspect, uplink control information (UL grant) and downlink control information (DL assignment) are transmitted to the MTC terminals at the same time, a control information demodulation section that demodulates the uplink control information and the downlink control information transmitted at the same time, may be provided. Obviously, it is equally possible to demodulate the uplink control information and the downlink control information which are transmitted at the same time, separately in the uplink control information demodulation section 405b and the downlink control information demodulation section 405c.

The downlink shared data demodulation section 406 demodulates the user data and higher control information, based on the downlink control information that is received as input from the downlink control information demodulation section 405c. The higher control information is output to a channel estimation section 407. When, in accordance with the third aspect of the present invention, resources allocated to the PUSCH_MTC are reported to the MTC terminals using higher layer signaling, the extracted higher control signal includes information related to the resource allocation of the PUSCH_MTC. Consequently, this information about resource allocation is sent to a mapping section 415, which will be described later, and used for the mapping of PUSCH_MTC.

The channel estimation section 407 performs channel estimation using user terminal-specific reference signals or common reference signals. The estimated channel variation is output to the downlink shared channel control information demodulation section 405a, the uplink control information demodulation section 405b, the downlink control information demodulation section 405c and the downlink shared data demodulation section 406. In these demodulation sections, downlink allocation information is demodulated using the estimated channel variation and the demodulation reference signals.

The uplink configuration will be described. The baseband signal processing section 104 has a data generating section 411, a channel coding section 412, a modulation section 413, a DFT section 414, a mapping section 415, an IFFT section 416, and a CP inserting section 417. The data generating section 411 generates transmission data from bit data that is received as input from the application section 105. The channel coding section 412 applies a channel coding process such as error correction, to transmission data, based on the coding rate reported by the MCS included in the uplink control information, and so on. The modulation section 413 modulates the transmission data having been subjected to channel coding by QPSK and so on, based on the modulation scheme that is reported by the MCS included in the uplink control information or the modulation scheme that is fixed in advance. For example, when the modulation scheme is not fixed to QPSK, the modulation section 413 executes modulation by the modulation scheme represented by this bit. On the other hand, when the modulation scheme is fixed to QPSK, the bit to represent the modulation scheme is omitted in the uplink control information. In this case, the modulation section 413 judges that the modulation scheme is QPSK and executes modulation. Note that it is nevertheless possible to provide a bit to represent the modulation scheme in the uplink control information when the modulation scheme is fixed to QPSK. In this case, the modulation section 413 executes modulation by the modulation scheme (that is, QPSK) represented by this bit.

The DFT section 414 performs a discrete Fourier transform on the modulated transmission data. In accordance with the first aspect of the present invention, the uplink transmission band of the MTC terminals is limited to a narrower band than the uplink system band of the LTE terminal. Consequently, the bandwidth to be involved in the discrete Fourier transform becomes narrow compared to the LTE terminal, so that it is possible to reduce the load of the DFT section 414. As a result, it is possible to reduce the cost of the DFT section 414.

The mapping section 415 maps the transmission data after the DFT to designated radio resources. That is, when, in accordance with the second aspect of the present invention, radio resources for the PUSCH_MTC are reported from the radio base station apparatus 20 using uplink control information (UL grant), the radio resources to use for uplink transmission are determined based on uplink control information that is reported from the uplink control information demodulation section 405b, and the PUSCH_MTC is mapped to these radio resources. Also, when, in accordance with the third aspect of the present invention, the resources allocated to the PUSCH_MTC are reported to the MTC terminals using higher layer signaling, the radio resources to use for uplink transmission are determined based on information related to the allocation of the PUSCH_MTC included in the higher control signal, and the PUSCH_MTC is mapped to these radio resources. Also, when, in accordance with the fourth aspect of the present invention, uplink control information (UL grant) and downlink control information (DL assignment) are transmitted to the MTC terminals at the same time, radio resources to use for uplink transmission are determined based at least on control information that is reported from a control information demodulation section that demodulates uplink control information, and the PUSCH_MTC is mapped to these radio resources.

The IFFT section 416 converts input data, which matches the system band, into time domain data by performing an inverse fast Fourier transform. The CP inserting section 417 inserts cyclic prefixes in the data after the inverse fast Fourier transform, in data units. In accordance with the first aspect of the present invention, the uplink transmission band of the MTC terminals is limited to a narrower band than the uplink system band of the LTE terminal. Consequently, the sampling rate to be involved in the inverse fast Fourier transform can be made big compared to the LTE terminal, so that it is possible to reduce the load on the IFFT section 416. As a result, it is possible to reduce the cost of the IFFT section 416.

The present invention is by no means limited to the above-described embodiment and can be implemented in various modifications within the scope of the spirit of the present invention.

INDUSTRIAL APPLICABILITY

The present invention is applicable to, for example, transmission power control, cross-carrier scheduling, and extension of uplink demodulation reference signals in LTE-A.

The disclosure of Japanese Patent Application No. 2011-224342, filed on Oct. 11, 2011, including the specification, drawings, and abstract, is incorporated herein by reference in its entirety.

The invention claimed is:

1. A radio communication terminal that performs machine communication via a base station apparatus of a radio communication system that is operated such that a frequency becomes a first band at a maximum, depending on performance which a communication device supports, the radio communication terminal comprising:
    a receiving section that has receiving performance to be able to support the first band, and that decodes an entire band of the first band at least with respect to a time domain where a downlink control channel is allocated; and
    a transmission section that has transmission performance to be able to support a second band having a narrower bandwidth than the first band, and that allocates an uplink control channel and an uplink data channel to the second band,
    wherein
        the receiving section receives downlink control information and uplink control information that are transmitted together from the base station apparatus, and
        in the downlink control information and the uplink control information, information bits for identifying between uplink and downlink are subtracted.

2. The radio communication terminal according to claim 1, wherein
    the receiving section receives the uplink control information via a downlink control channel,
    the uplink control information represents uplink resource allocation, and
    the transmission section determines frequency resources for the second band based on the uplink resource allocation represented by the uplink control information.

3. The radio communication terminal according to claim 1, wherein
    the receiving section receives the uplink control information via a downlink control channel,
    the uplink control information is made compact by reducing information bits to designate an uplink modulation scheme, and
    the transmission section modulates an uplink transmission signal in accordance with an uplink modulation scheme that is fixed in advance.

4. The radio communication terminal according to claim 1, wherein
    the receiving section receives the uplink control information via a downlink control channel,
    the uplink control information includes a resource block index representing a top of the second band and is made compact by reducing information bits to designate a size of the second band, and
    the transmission section determines frequency resources for the second band from the resource block index that is reported in the uplink control information and the size of the second band that is fixed in advance.

5. The radio communication terminal according to claim 1, wherein the transmission section determines frequency resources for the second band from a resource block index that represents a top of the second band, and a size of the second band that is fixed in advance, that are reported from the base station apparatus by higher layer signaling.

6. The radio communication terminal according to claim 1,
    wherein the receiving section receives the uplink control information via a downlink control channel, and
    the uplink control information is made compact by reducing information bit for uplink resource allocation.

7. The radio communication terminal according to claim 1, wherein the receiving section receives a data channel allocated to a limited band within the first band, and decodes the limited band in the first band with respect to a time domain where a data channel is allocated.

8. The radio communication terminal according to claim 1, wherein one set of information bits for CRC (Cyclic Redundancy Check) is assigned over an entire of the downlink control information and the uplink control information that are transmitted together from the base station apparatus.

9. A base station apparatus that performs machine communication with a radio communication terminal in a radio communication system that is operated such that a frequency becomes a first band at a maximum, depending on performance which a communication device supports, the base station apparatus comprising:
    an allocation section that allocates a second band having a narrower bandwidth than the first band to uplink for the radio communication terminal;
    a transmission section that transmits downlink control information and uplink control information together on a downlink where the first band is allocated, the uplink control information including uplink resource allocation information assigned to the uplink for the radio communication terminal; and
    a receiving section that receives an uplink transmission signal from the communication device in the first band, and receives an uplink transmission signal from the radio communication terminal in the second band,
    wherein, in the downlink control information and the uplink control information, information bits for identifying between uplink and downlink are subtracted.

10. The base station apparatus according to claim 9, wherein the transmission section transmits the uplink control information including the uplink resource allocation information via a downlink control channel.

11. The base station apparatus according to claim 9, wherein the transmission section transmits the uplink resource allocation information with higher layer signaling.

12. A radio communication system that is operated such that a frequency becomes a first band at a maximum, depending on performance which a communication device supports, and the radio communication system comprising:
   a base station apparatus; and
   a radio communication terminal that performs machine communication via the base station apparatus, wherein the base station apparatus includes:
   a transmission section that transmits downlink control information and uplink control information together to the radio communication terminal, the uplink control information including radio resource allocation information representing resource allocation of an uplink of a second band having a narrow bandwidth than the first band; and
   a receiving section that receives an uplink transmission signal from the communication device in the first band, and receives an uplink transmission signal from the radio communication terminal in the second band, and
   the radio communication terminal includes:
   a receiving section that has receiving performance to be able to support the first band, that decodes an entire band of the first band at least with respect to a time domain where a downlink control channel is allocated, and that receives downlink control information and uplink control information that are transmitted together from the base station apparatus; and
   a transmission section that has transmission performance to be able to support the second band, and that allocates an uplink control channel and an uplink data channel to the second band, wherein
   in the downlink control information and the uplink control information, information bits for identifying between uplink and downlink are subtracted.

13. A radio communication method of a radio communication terminal to perform machine communication via a base station apparatus of a radio communication system that is operated such that a frequency becomes a first band at a maximum, depending on performance which a communication device supports, wherein:
   the radio communication terminal has receiving performance to be able to support the first band, and has transmission performance to be able to support a second band having a narrower bandwidth than the first band; and
   the radio communication method comprising the steps of:
   decoding an entire band of the first band at least with respect to a time domain where a downlink control channel is allocated;
   allocating and transmitting an uplink control channel and an uplink data channel in the second band; and
   receiving downlink control information and uplink control information that are transmitted together from the base station apparatus, wherein
   in the downlink control information and the uplink control information, information bits for identifying between uplink and downlink are subtracted.

14. A radio communication method for performing machine communication in a base station apparatus of a radio communication system that is operated such that a frequency becomes a first band at a maximum, depending on performance which a communication device supports, with a radio communication terminal, the radio communication method comprising the steps of:
   allocating a second band having a narrower bandwidth than the first band to uplink for the radio communication terminal;
   transmitting downlink control information and uplink control information together on a downlink where the first band is allocated, the uplink control information including uplink resource allocation assigned to the uplink for the radio communication terminal; and
   receiving an uplink transmission signal from the communication device in the first band, and receiving an uplink transmission signal from the radio communication terminal in the second band,
   wherein, in the downlink control information and the uplink control information, information bits for identifying between uplink and downlink are subtracted.

* * * * *